(12) United States Patent
Mercer et al.

(10) Patent No.: US 11,440,078 B2
(45) Date of Patent: Sep. 13, 2022

(54) DRIVE ASSEMBLY

(71) Applicant: Stolle Machinery Company, LLC, Centennial, CO (US)

(72) Inventors: Richard James Edward Mercer, North Yorkshire (GB); Ian Kenneth Scholey, Barnsley (GB); Russell Bauer, West Chester, OH (US); Daniel A. Jansen, Cincinnati, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 136 days.

(21) Appl. No.: 17/021,401

(22) Filed: Sep. 15, 2020

(65) Prior Publication Data

US 2022/0080489 A1    Mar. 17, 2022

(51) Int. Cl.
*B21D 51/26* (2006.01)

(52) U.S. Cl.
CPC ................... *B21D 51/2638* (2013.01)

(58) Field of Classification Search
CPC . B21D 51/2638; B21D 51/2615; B21D 51/26
See application file for complete search history.

(56) References Cited

U.S. PATENT DOCUMENTS

| | | | | |
|---|---|---|---|---|
| 3,581,542 A | * | 6/1971 | Wahler | B21D 51/2615 72/94 |
| 4,316,375 A | * | 2/1982 | Lee, Jr. | B65D 7/42 72/105 |
| 4,513,595 A | * | 4/1985 | Cvacho | B21D 51/2615 413/1 |
| 6,085,563 A | * | 7/2000 | Heiberger | B21D 51/2692 413/69 |
| 6,240,760 B1 | | 6/2001 | Heiberger et al. | |
| 6,698,265 B1 | * | 3/2004 | Thomas | B21D 51/26 72/94 |
| 8,464,567 B2 | | 6/2013 | Saville | |

(Continued)

FOREIGN PATENT DOCUMENTS

WO    WO-2017065773 A1 *  4/2017  ............. B21D 51/38

OTHER PUBLICATIONS

U.S. Patent and Trademark Office, PCT/US21/50190 International Search Report, dated Dec. 22, 2021, 17 pages.

*Primary Examiner* — Gregory D Swiatocha
(74) *Attorney, Agent, or Firm* — Eckert Seamans Cherin & Mellott, LLC

(57) ABSTRACT

A drive assembly for a necker machine having a frame assembly and a plurality of processing stations includes: a plurality of drive sub-modules. Each drive sub-module includes: a primary input shaft, a first primary output shaft operatively coupled to the primary input shaft, and a second primary output shaft operatively coupled to the primary input shaft. For a first drive sub-module: the primary input shaft is operatively coupled to, and driven by, a main drive assembly motor, and the first primary output shaft is operatively coupled to, and drives, an associated first drive shaft of a first processing station. For a second drive sub-module: the primary input shaft is operatively coupled to, and driven by, the second primary output shaft of the first drive sub-module, and the first primary output shaft is operatively coupled to, and drives, an associated first drive shaft of a second processing station.

16 Claims, 10 Drawing Sheets

(56) References Cited

U.S. PATENT DOCUMENTS

| | | | |
|---|---|---|---|
| 8,601,843 B2 | 12/2013 | Dunwoody et al. | |
| 9,095,888 B2 | 8/2015 | Babbitt et al. | |
| 9,308,570 B2 | 4/2016 | Dunwood et al. | |
| 9,718,110 B2* | 8/2017 | Butcher | B30B 1/28 |
| 9,968,982 B2* | 5/2018 | Dunwoody | B21D 51/2692 |
| 10,352,385 B2* | 7/2019 | Butcher | F16D 67/02 |
| 10,875,077 B2* | 12/2020 | Wang | B21D 51/2638 |
| 2005/0193796 A1* | 9/2005 | Heiberger | B21D 51/2615 |
| | | | 72/356 |
| 2009/0266130 A1* | 10/2009 | Saville | B21D 51/2615 |
| | | | 72/94 |
| 2013/0233123 A1* | 9/2013 | Bowlin | F16H 53/06 |
| | | | 74/569 |
| 2019/0344326 A1 | 11/2019 | Mercer et al. | |
| 2021/0187587 A1* | 6/2021 | Endo | B26D 7/1863 |

* cited by examiner

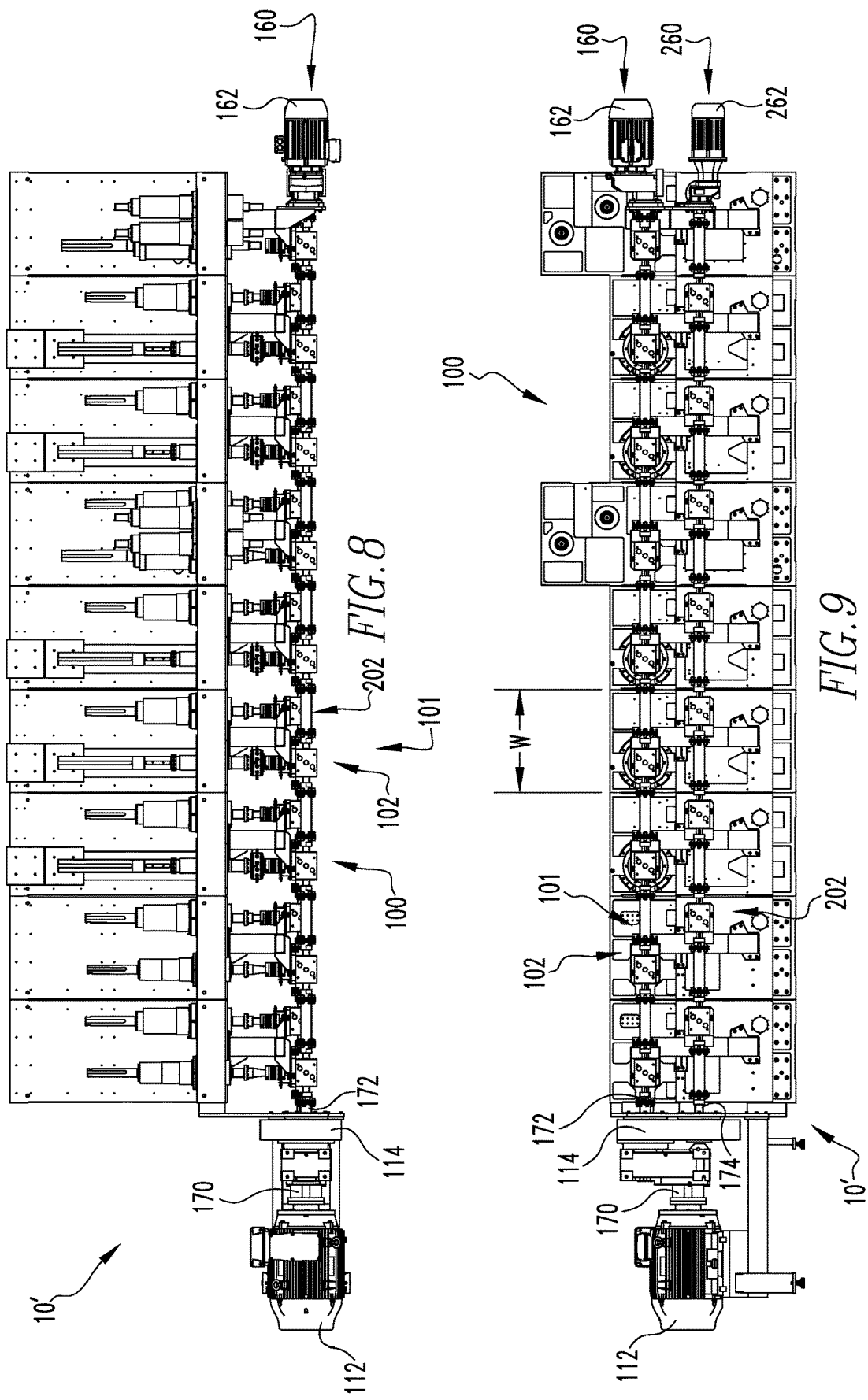

ДRIVE ASSEMBLY

BACKGROUND OF THE INVENTION

Field of the Invention

The disclosed and claimed concepts relates to drive assemblies and, more particularly, to drive assemblies for necker machines.

Background Information

Can bodies are, typically, formed in a bodymaker. That is, a bodymaker forms blanks such as, but not limited to, disks or cups into an elongated can body. A can body includes a base and a depending sidewall. The sidewall is open at the end opposite the base. The bodymaker, typically, includes a ram/punch that moves the blanks through a number of dies to form the can body. The can body is ejected from the ram/punch for further processing such as, but not limited to, trimming, washing, printing, flanging, and inspecting, before being placed on pallets which are then shipped to a filler. At the filler, the cans are taken off of the pallets, filled, have ends placed on them, and then are typically repackaged in various quantities (e.g., six packs, twelve pack or other multi-can cases, etc.) for sale to the consumer.

Some can bodies after being formed in a bodymaker are further formed in a necker machine. Necker machines are structured to reduce the cross-sectional area of a portion of a can body sidewall, i.e., at the open end of the sidewall. That is, prior to coupling a can end to the can body, the diameter/radius of the can body sidewall open end is reduced relative to the diameter/radius of other portions of the can body sidewall. The necker machine includes a number of processing and/or forming stations disposed in series. That is, the processing and/or forming stations are disposed adjacent to each other and a transfer assembly moves a can body between adjacent processing and/or forming stations. As the can body moves through the processing and/or forming stations it is processed or formed. A greater number of processing and/or forming stations in a necker machine is not desirable. That is, it is desirable to have the least number of processing and/or forming stations possible while still completing the desired forming.

Current drive assemblies for necker machines typically incorporate an oil bath to lubricate gears. Such arrangements are problematic in regard to repairs and general maintenance as the entire gear train for all of the forming stations has to be drained down and resealed generally when anything needs done. The gears used in such drive assemblies have to transmit a large amount of power and torque during operation and as such are large steel gears. Other technology has been adopted to attempt to address such problems by using composite materials on some or all of the gears, thus generally allowing for no lubrication. However, such gears are generally even larger and generate a lot of heat. The lack of lubrication and large heat generation can lead to rapid degradation of the composite material and a significant reduction in the performance of the equipment.

SUMMARY OF THE INVENTION

Such deficiencies in the art, and others, are addressed by at least one embodiment of the disclosed concept which provides a drive assembly for a necker machine having a frame assembly and a plurality of processing stations, each processing station having a number of drive shafts. The drive assembly comprises: a plurality of primary drive sub-modules, each primary drive sub-module comprising: a primary input shaft; a first primary output shaft operatively coupled to the primary input shaft; and a second primary output shaft operatively coupled to the primary input shaft; wherein for a first primary drive sub-module of the plurality of primary drive sub-modules: the primary input shaft is structured to be operatively coupled to, and driven by, a main drive assembly motor, and the first primary output shaft is structured to be operatively coupled to, and drive, an associated first drive shaft of the number of drive shafts of a first processing station of the number of processing stations, and wherein for a second primary drive sub-module of the plurality of primary drive sub-modules: the primary input shaft is operatively coupled to, and driven by, the second primary output shaft of the first primary drive sub-module, and the first primary output shaft is structured to be operatively coupled to, and drive, an associated first drive shaft of the number of drive shafts of a second processing station of the number of processing stations.

The plurality of primary drive modules may comprise at least three primary drive sub-modules, and for a third primary drive sub-module of the plurality of primary drive sub-modules: the primary input shaft may be operatively coupled to, and driven by, the second primary output shaft of the second primary drive sub-module, and the first primary output shaft may be structured to be operatively coupled to, and drive, one drive shaft of the number of drive shafts of a third processing station of the number of processing stations.

For each primary drive sub-module, the first primary output shaft may be operatively coupled to the primary input shaft via a primary right-angle gearbox.

At least one primary drive sub-module may include a primary clutch unit structured to selectively operatively couple the first primary output shaft to the associated first drive shaft, and the primary clutch unit may be selectively moveably among: a first positioning wherein the first primary output shaft is operatively coupled to, and thus able to drive, the associated first drive shaft; and a second positioning wherein the first primary output shaft is disengaged from, and thus not able to drive, the associated first drive shaft.

The at least one primary drive sub-module may further include a position sensing system structured to sense and provide an indication of the relative rotational positioning of the first primary output shaft and the associated first drive shaft.

The at least one primary drive sub-module may further include a primary brake unit structured to selectively brake at least one of the primary input shaft, the first primary output shaft, or the second primary output shaft.

The drive assembly may further comprise: a plurality of secondary drive sub-modules, each secondary drive sub-module comprising: a secondary input shaft; a first secondary output shaft operatively coupled to the secondary input shaft; and a second secondary output shaft operatively coupled to the secondary input shaft; wherein for a first secondary drive sub-module of the plurality of secondary drive sub-modules: the secondary input shaft is structured to be coupled to, and driven by, the main drive assembly motor, and the first secondary output shaft is structured to be operatively coupled to, and drive, a second drive shaft of the number of drive shafts of the first processing station, and wherein for a second secondary drive sub-module of the plurality of secondary drive sub-modules: the secondary input shaft is operatively coupled to, and driven by, the second secondary output shaft of the first secondary drive sub-module, and the first secondary output shaft is structured to be operatively coupled to, and drive, a second drive shaft of the number of drive shafts of the second processing station.

The drive assembly may further comprise a main gearbox having a main input shaft, a first main output shaft operatively coupled to the main input shaft, and a second main output shaft operatively coupled to the main input shaft, wherein the main input shaft of the main gearbox is structured to be operatively coupled to, and driven by, the main drive assembly motor, wherein the primary input shaft of the first primary drive sub-module is operatively coupled to, and driven by the first main output shaft of the main gearbox, and wherein the secondary input shaft of the first secondary drive sub-module is operatively coupled to, and driven by the second main output shaft of the main gearbox.

The plurality of secondary drive modules may comprise at least three secondary drive sub-modules, wherein for a third secondary drive sub-module of the plurality of secondary drive sub-modules: the secondary input shaft is operatively coupled to, and driven by, the second secondary output shaft of the second secondary drive sub-module, and the first secondary output shaft is structured to be operatively coupled to, and drive, a second drive shaft of the number of drive shafts of a third processing station of the number of processing stations.

For each secondary drive sub-module, the first secondary output shaft may be operatively coupled to the secondary input shaft via a secondary right-angle gearbox.

For each secondary drive sub-module, the first secondary output shaft may be selectively operatively coupled to the secondary input shaft via a secondary clutch unit, and the secondary clutch unit may be selectively moveably among: a first positioning wherein the first secondary output shaft is operatively coupled to, and driven by, the secondary input shaft, and a second positioning wherein the first secondary output shaft is disengaged from, and not driven by, the secondary input shaft.

For each secondary drive sub-module, the second secondary output shaft may be selectively operatively coupled to the secondary input shaft via a secondary brake unit.

The drive assembly may further comprise: the main drive assembly motor operatively coupled to the main input shaft of the main gearbox; a primary motor operatively coupled to the second primary output shaft of the second primary drive sub-module; and a secondary motor operatively coupled to the second secondary output shaft of the second secondary drive sub-module.

As another embodiment of the disclosed concept a necker machine comprises: a frame assembly; a plurality of processing stations, each processing station having a number of drive shafts, and a drive assembly comprising: a plurality of primary drive sub-modules, each primary drive sub-module comprising: a primary input shaft; a first primary output shaft operatively coupled to the primary input shaft; and a second primary output shaft operatively coupled to the primary input shaft; wherein for a first primary drive sub-module of the plurality of primary drive sub-modules: the primary input shaft is structured to be operatively coupled to, and driven by, a main drive assembly motor, and the first primary output shaft is operatively coupled to, and drives, a first drive shaft of the number of drive shafts of a first processing station of the number of processing stations, and wherein for a second primary drive sub-module of the plurality of primary drive sub-modules: the primary input shaft is operatively coupled to, and driven by, the second primary output shaft of the first primary drive sub-module, and the first primary output shaft is operatively coupled to, and drives, a first drive shaft of the number of drive shafts of a second processing station of the number of processing stations.

The drive assembly may further comprise: a plurality of secondary drive sub-modules, each secondary drive sub-module comprising: a secondary input shaft; a first secondary output shaft operatively coupled to, and driven by, the secondary input shaft; and a second secondary output shaft operatively coupled to, and driven by, the secondary input shaft; wherein for a first secondary drive sub-module of the plurality of secondary drive sub-modules: the secondary input shaft is structured to be coupled to, and driven by, the main drive assembly motor, and the first secondary output shaft is operatively coupled to, and drives, a second drive shaft of the number of drive shafts of the first processing station, and wherein for a second secondary drive sub-module of the plurality of secondary drive sub-modules: the secondary input shaft is operatively coupled to, and driven by, the second secondary output shaft of the first secondary drive sub-module, and the first secondary output shaft is operatively coupled to, and drives, a second drive shaft of the number of drive shafts of the second processing station.

The necker machine may further comprise a main gearbox having a main input shaft, a first main output shaft operatively coupled to the main input shaft, and a second main output shaft operatively coupled to the main input shaft, wherein the main input shaft of the main gearbox is structured to be operatively coupled to, and driven by, the main drive assembly motor, wherein the primary input shaft of the first primary drive sub-module is operatively coupled to, and driven by the first main output shaft of the main gearbox, and wherein the secondary input shaft of the first secondary drive sub-module is operatively coupled to, and driven by the second main output shaft of the main gearbox.

The necker machine may further comprise: the main drive assembly motor operatively coupled to the main input shaft of the main gearbox; a primary motor operatively coupled to the second primary output shaft of the second primary drive sub-module; and a secondary motor operatively coupled to the second secondary output shaft of the second secondary drive sub-module.

The first drive shaft of the first processing station may drive a processing apparatus of the first processing station; the second drive shaft of the first processing station may drive a transfer apparatus of the first processing station; the first drive shaft of the second processing station may drive a necking apparatus of the second processing station; and the second drive shaft of the second processing station may drive a transfer apparatus of the second processing station.

These and other objects, features, and characteristics of the disclosed concept, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the accompanying drawings in which:

FIG. 8 is a partially schematic top view of the drive assembly of FIG. 6.

FIG. 9 is a partially schematic elevation view of the drive assembly of FIGS. 6 and 8.

DESCRIPTION OF THE PREFERRED EMBODIMENTS

Figure 1:
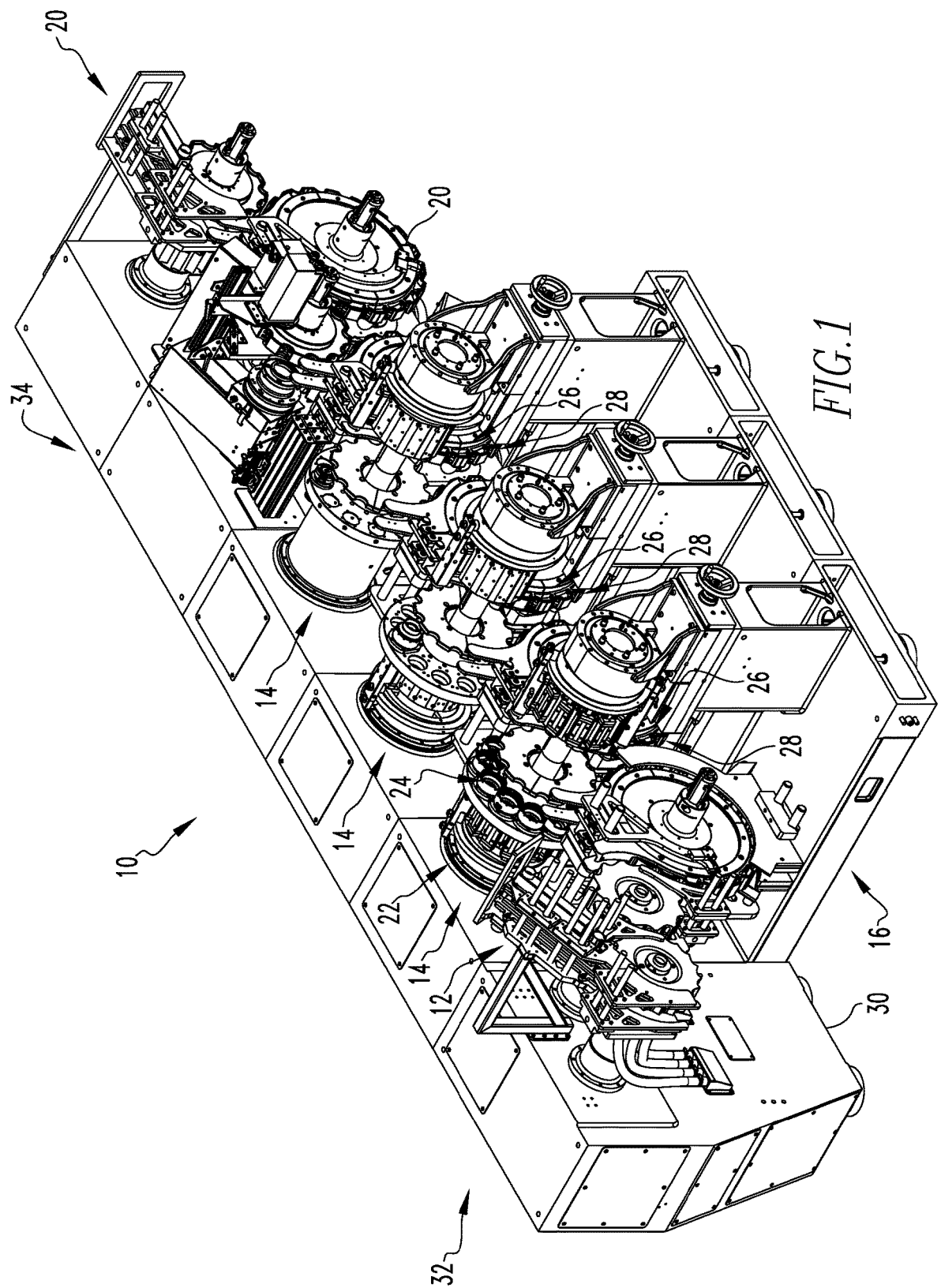
FIG. 1 is a front isometric view of a necker machine.
Figure 2:
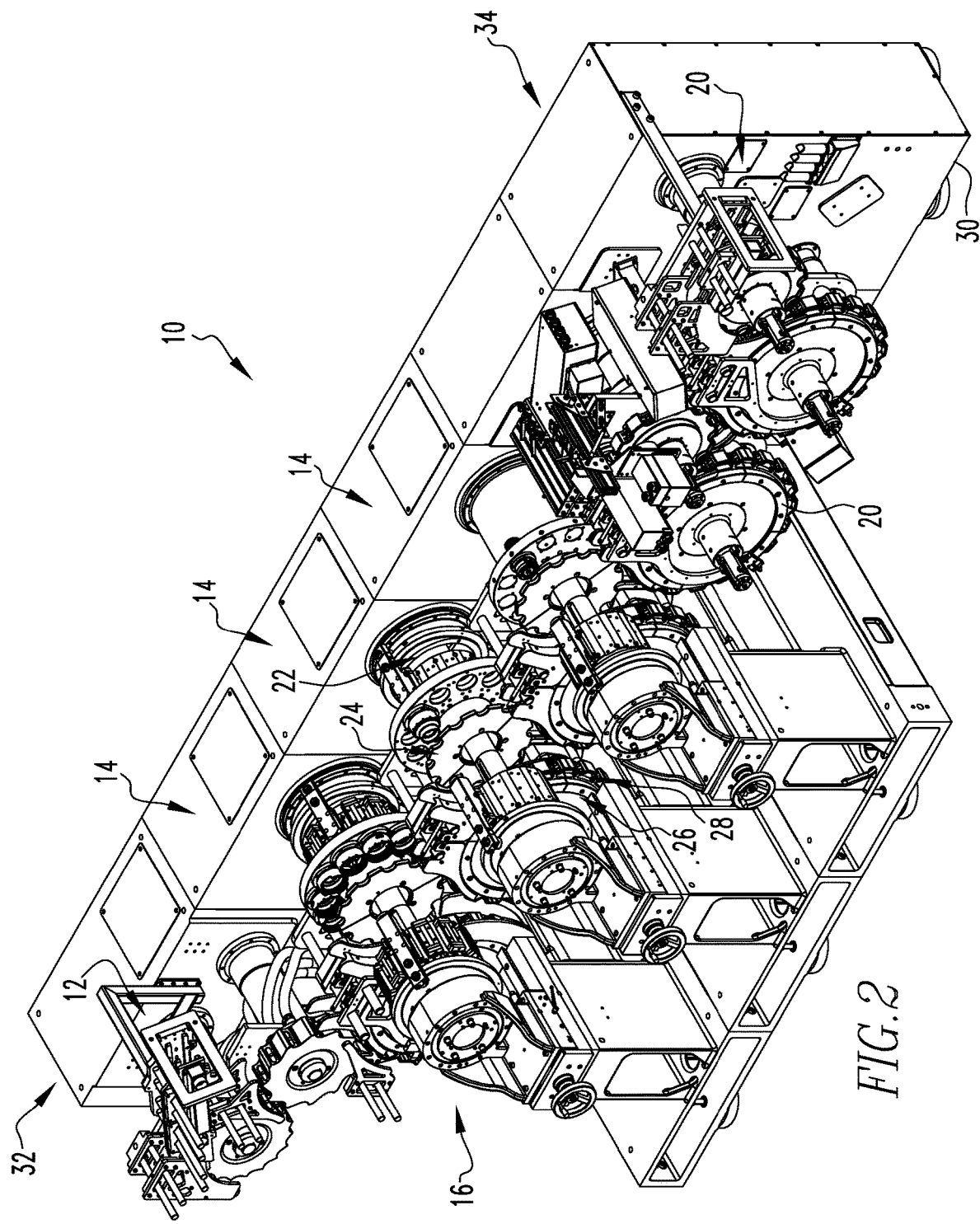
FIG. 2 is another front isometric view of the necker machine of FIG. 1.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore. Further, a passage in an element is part of the "coupling" or "coupling component(s)." For example, in an assembly of two wooden boards coupled together by a nut and a bolt extending through passages in both boards, the nut, the bolt and the two passages are each a "coupling" or "coupling component."

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center of the cylinder. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends from the bottom of a cylinder toward the top of the cylinder and substantially parallel to a central longitudinal axis of the cylinder.

As employed herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and beverage cans, as well as food cans.

As used herein, a "product side" means the side of a container that contacts, or could contact, a product such as, but not limited to, a food or beverage. That is, the "product side" of the construct is the side of the construct that, eventually, defines the interior of a container.

As used herein, a "customer side" means the side of a construct used in a container that does not contact, or could not contact, a product such as, but not limited to, a food or beverage. That is, the "customer side" of the construct is the side of the construct that, eventually, defines the exterior of a container.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "drive assembly" means elements that are operatively coupled to the rotating shafts extending back to front in a processing station. A "drive assembly" does not include the rotating shafts extending back to front in a processing station.

As used herein, a "lubrication system" means a system that applies a lubricant to the external surfaces of a linkage, e.g., shafts and gears, of a drive assembly.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

An example necker machine 10 for which a drive assembly in accordance with the concepts disclosed herein may be employed is illustrated in FIGS. 1-4. While a brief description of the general elements and operation of necker machine 10 is provided herein, a detailed description of necker machine 10 and the operation thereof is provided in U.S. patent application Ser. No. 16/407,292, filed May 9, 2019 (having common inventors with this application), the contents of which are incorporated by reference herein. Some other examples of necker machines for which drive assemblies in accordance with the concepts disclosed herein may be employed are described in, for example, without limitation, U.S. Pat. Nos. 8,464,567, 8,601,843, 9,095,888, and 9,308,570, the contents of each being incorporated by referenced herein.

Figure 5:
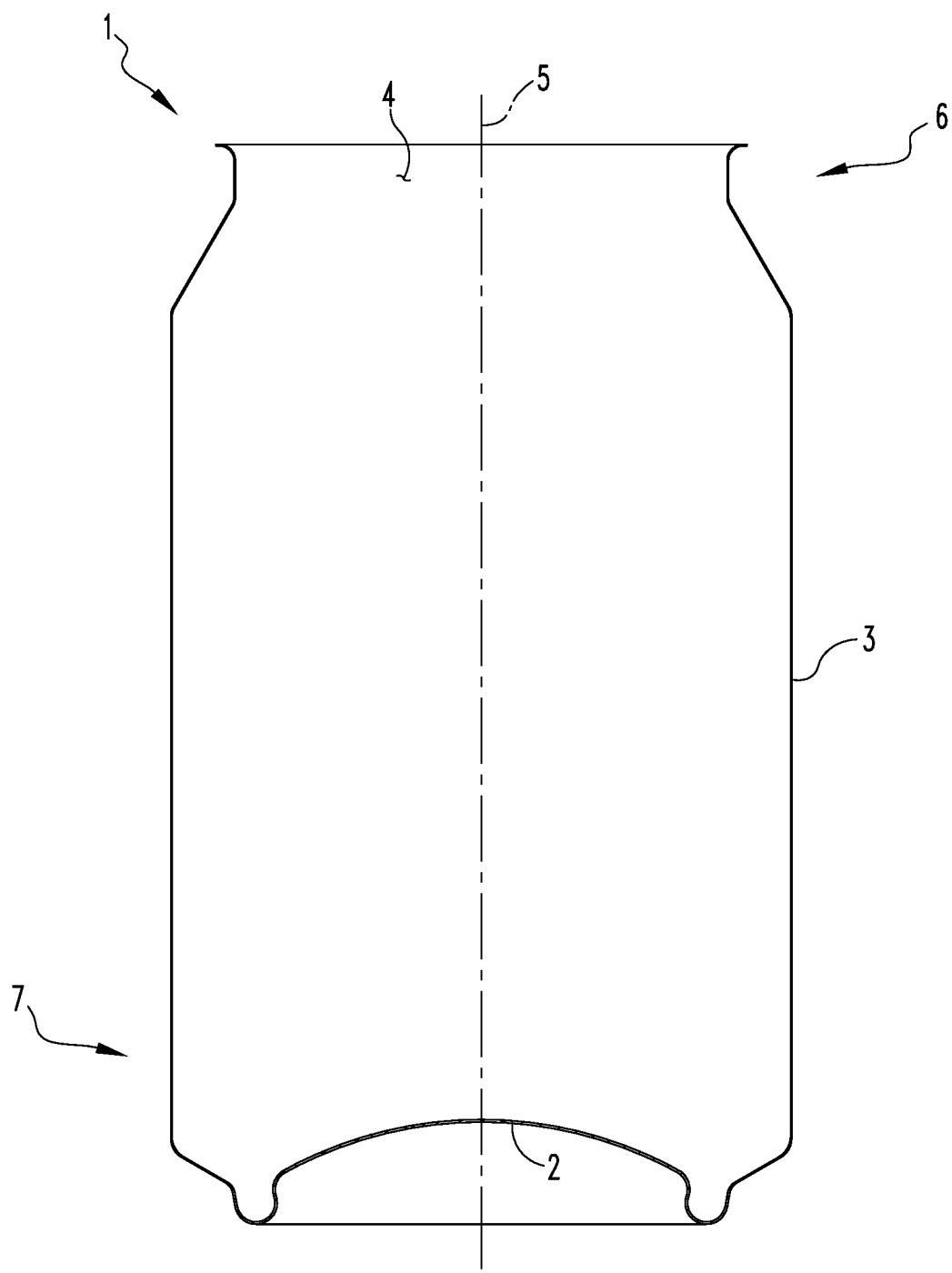
FIG. 5 is a schematic cross-sectional view of a can body.

As previously discussed in the Background Information above, the necker machine 10 is structured to reduce the diameter of a portion of a can body 1, such as illustrated in FIG. 5. As used herein, to "neck" means to reduce the diameter/radius of a portion of a can body 1. That is, as shown in FIG. 5, a can body 1 includes a base 2 with an upwardly depending sidewall 3. The can body base 2 and can body sidewall 3 define a generally enclosed space 4. In the embodiment discussed below, the can body 1 is a generally circular and/or an elongated cylinder. It is understood that this is only one exemplary shape and that the can body 1 can have other shapes. The can body has a longitudinal axis 5. The can body sidewall 3 has a first end 6 and a second end 7. The can body base 2 is at the second end 7. The can body first end 6 is open. The can body first end 6 initially has substantially the same radius/diameter as the can body sidewall 3. Following forming operations in the necker machine 10, the radius/diameter of the can body first end 6 is smaller than the other portions of the radius/diameter at the can body sidewall 3.

Figure 4:
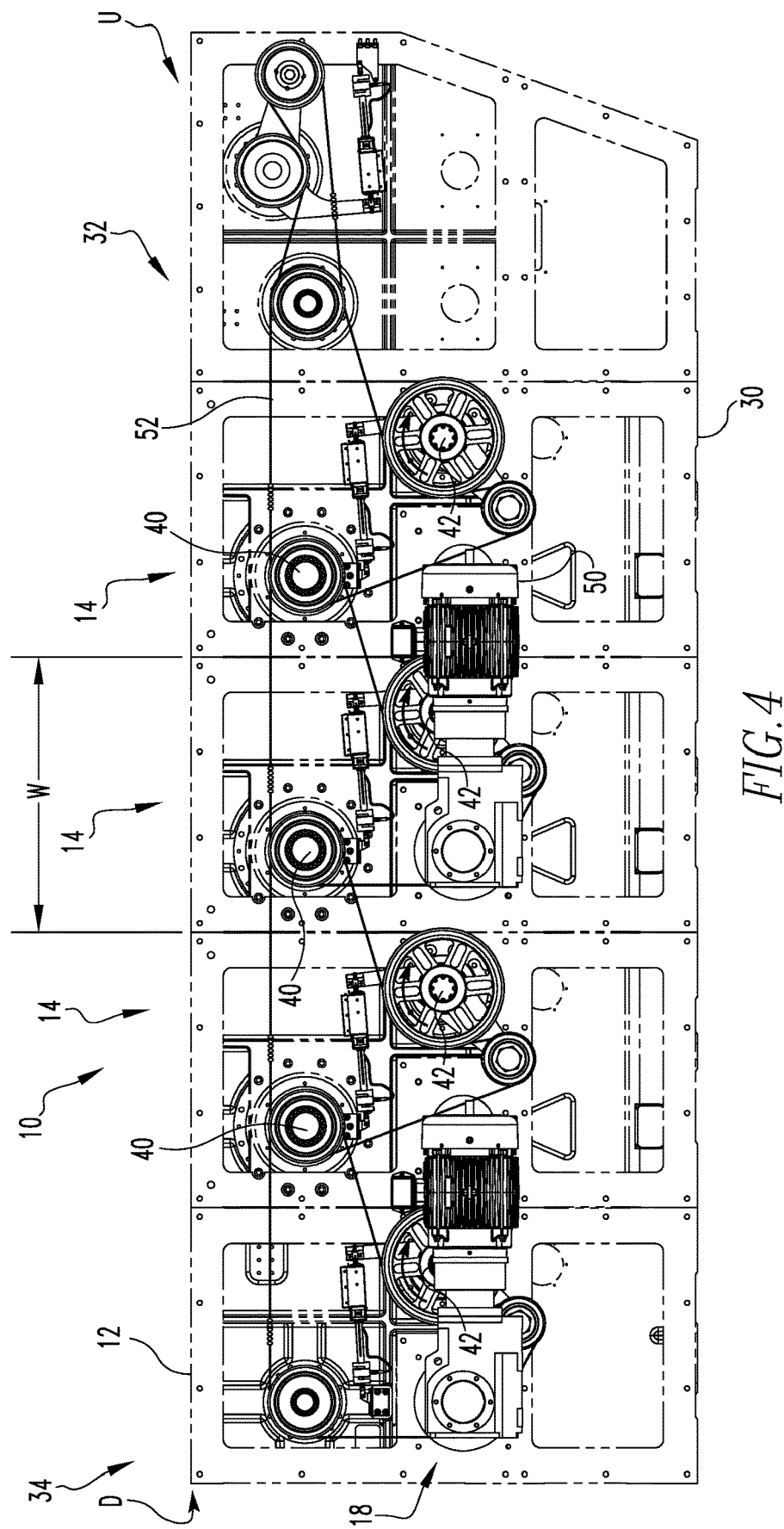
FIG. 4 is a rear elevation view of the necker machine of FIGS. 1-3 showing the drive assembly of the necker machine.

The necker machine 10 generally includes an infeed assembly 12, a plurality of processing/forming stations 14, a transfer assembly 16, and a drive assembly 18 (FIG. 4). Hereinafter, the processing/forming stations 14 are identified by the term "processing stations 14" and refer to generic processing stations 14. Each processing station 14 has a width W (FIG. 4) that is generally the same as all the other processing stations 14. Thus, the length/space occupied by the necker machine 10 is generally determined by the quantity of processing stations 14 utilized therein.

Figure 3:
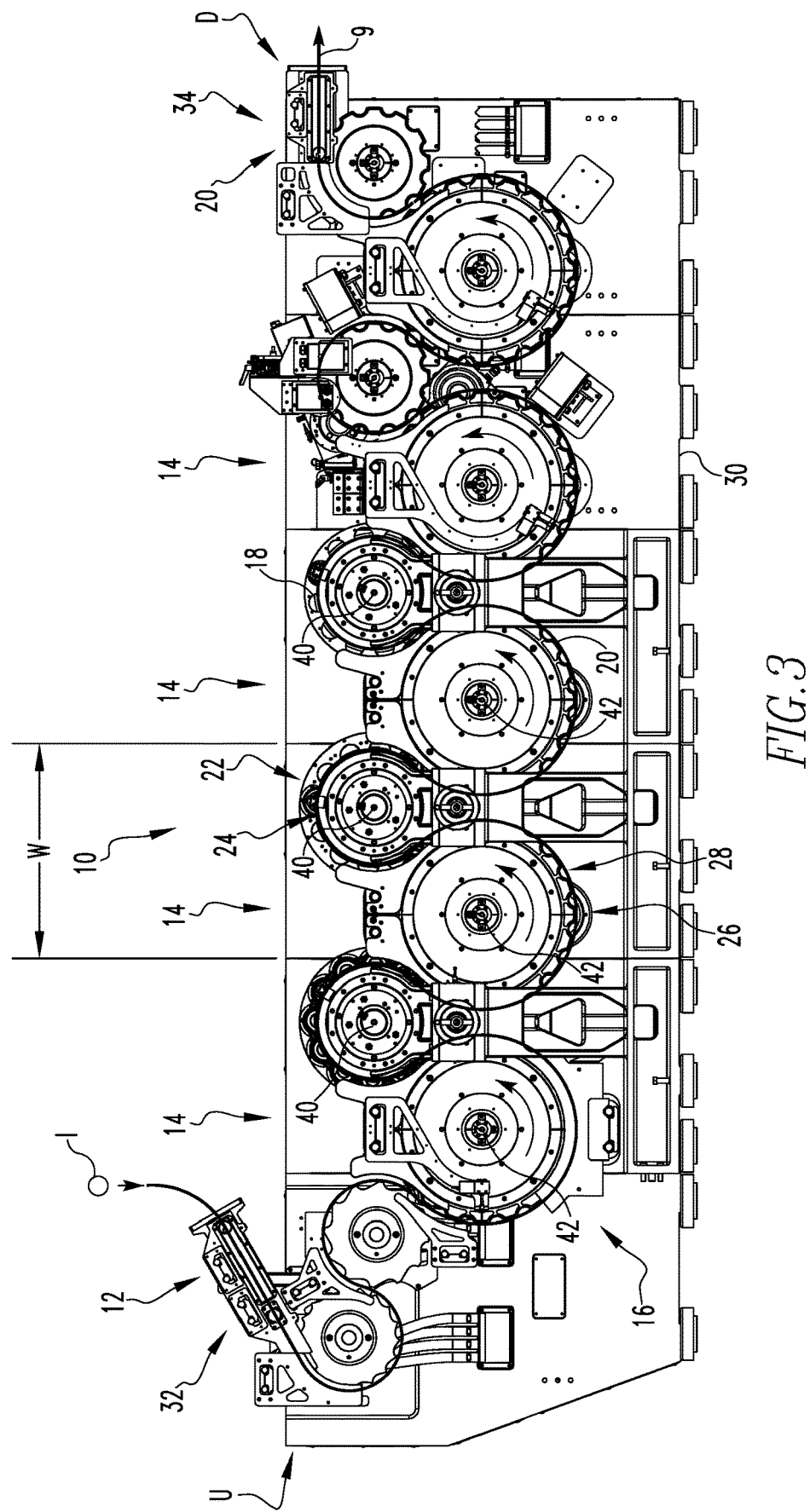
FIG. 3 is a front elevation view of the necker machine of FIGS. 1 and 2 showing the processing stations of the necker machine.

As is known, the processing stations 14 are disposed adjacent to each other and in series. That is, the can bodies 1 being processed by the necker machine 10 each move from an upstream location through a series of processing stations 14 in the same sequence. The can bodies 1 follow a path, hereinafter, the "work path 9" (FIG. 3). That is, the necker machine 10 defines the work path 9 wherein can bodies 1 move from an "upstream" location U to a "downstream" location D, such as shown in FIG. 3; as used herein, "upstream" generally means closer to the infeed assembly 12 and "downstream" means closer to an exit assembly 20. With regard to elements that define the work path 9, each of those elements have an "upstream" end and a "downstream" end" wherein the can bodies move from the "upstream" end to the "downstream end." Thus, as used herein, the nature/identification of an element, assembly, sub-assembly, etc. as an "upstream" or "downstream" element or assembly, or, being in an "upstream" or "downstream" location, is inherent. Further, as used herein, the nature/identification of an element, assembly, sub-assembly, etc. as an "upstream" or "downstream" element or assembly, or, being in an "upstream" or "downstream" location, is a relative term.

As noted above, each processing station 14 has a similar width W (i.e., the distance between the upstream and downstream edges), and the can body 1 is processed and/or formed (or partially formed) as the can body 1 moves across the width W. Generally, the processing/forming of the can body occurs in/at a rotatable turret 22 in each processing station 14. That is, the term "turret 22" identifies a generic turret. Each processing station 14 includes a rotatable non-vacuum starwheel 24 associated with the turret 22. As used herein, a "non-vacuum starwheel" means a starwheel that does not include, or is not associated with, a vacuum assembly, that is structured to apply a vacuum to the starwheel pockets. Further, each processing station 14 typically includes one turret 22 and one non-vacuum starwheel 24.

The transfer assembly 16 is structured to move the can bodies 1 between adjacent processing stations 14. The transfer assembly 16 includes a plurality of rotatable vacuum starwheels 26, with each vacuum starwheel 26 being a part of a respective processing station 14. As used herein, a "vacuum starwheel" means a starwheel assembly that includes, or is associated with, a vacuum assembly that is structured to apply a vacuum to the starwheel pockets 28. Further, the term "vacuum starwheel 26" identifies a generic vacuum starwheel 26. A vacuum starwheel 26 includes a disk-like body (or disk-like body assembly) and a plurality of pockets 28 disposed on or formed in the radial surface of the disk-like body. When used in association with generally cylindrical can bodies 1, the pockets 28 are generally semi-cylindrical. A vacuum assembly (not numbered), selectively applies suction to each of the pockets 28 and is structured to selectively couple a can body 1 to a pocket 28. It is understood, and as used herein, that "to apply a vacuum to a pocket 28" means that a vacuum (or suction) is applied to a starwheel pocket radially extending passage.

It is noted that the plurality of processing stations 14 may be structured to neck different types of can bodies 1 and/or to neck can bodies in different configurations. Thus, the plurality of processing stations 14 are structured to be added and removed from the necker machine 10 depending upon the need. To accomplish this, the necker machine 10 includes a frame assembly 30 to which the plurality of processing stations 14 are removably coupled. Alternatively, the frame assembly 30 includes elements incorporated into each of the plurality of processing stations 14 so that the plurality of processing stations 14 are structured to be temporarily coupled to each other. The frame assembly 30 has an upstream end 32 and a downstream end 34. Further, the frame assembly 30 includes elongated members, panel members (neither numbered), or a combination of both. As is known, panel members coupled to each other, or coupled to elongated members, form a housing. Accordingly, as used herein, a housing is also identified as a "frame assembly 30."

When necker machine 10 is operated, the infeed assembly 12 feeds individual can bodies 1 into the transfer assembly 16 which moves each can body 1 sequentially through each of the processing stations 14 from the most upstream processing station 14 to the most downstream processing station 14. More particularly, each can body 1 moves from a vacuum starwheel 26, to a non-vacuum starwheel 24, to a turret 22 where a forming operation occurs, back to the aforementioned non-vacuum starwheel 24, and on to the next downstream vacuum starwheel 26. Generally, each processing station 14 is structured to partially form the can body 1 so as to gradually reduce the cross-sectional area of the can body first end 6 as the can body 1 moves through the processing stations 14. The processing stations 14 include some elements that are unique to a single processing station 14, such as, but not limited to, a specific die. Other elements, e.g., the turret 22 and starwheels 24, 26 of the processing stations 14 are common to all, or most, of the processing stations 14. Such process continues until the can body 1 has passed through all of the processing stations 14 along the work path 9 and then exits the necker machine 10 via the exit assembly 20.

Referring to the view shown in FIG. 3, in order to move the can body 1 through the example necker machine 10, each of the turrets 22 and non-vacuum starwheels 24 are rotated in a clockwise direction at a first rotational speed by respective processing or primary drive shafts 40 while each of the vacuum starwheels 26 are rotated in a counterclockwise direction at a second rotational speed by respective transfer or secondary drive shafts 42. Such rotation of each of the primary and secondary drive shafts 40, 42 of each processing station 14 is provided by the drive assembly 18 illustrated in FIG. 4, which provides a belt-driven approach addressing shortcomings of drive assemblies such as previously discussed in the Background Information herein. The drive assembly 18 includes a plurality of motors 50 and a number of timing/drive belts 52 that are utilized to cause rotation of the primary and secondary drive shafts 40, 42 of each of the forming stations 14.

Having thus described the basic operation of the necker machine 10, a drive assembly 100 that addresses shortcomings of drive assemblies such as previously discussed herein and that may be readily sized and configured to be utilized in place of the drive assembly 18 of necker machine 10 as well as the drive assemblies of other necker machines (e.g., without limitation, necker machines discussed in U.S. Pat. Nos. 8,464,567, 8,601,843, 9,095,888, and 9,308,570) will now be discussed in conjunction with FIGS. 6-11. The drive assembly 100 includes a plurality of drive sub-modules 101 (six modules separately labeled 101A-101H are shown for reference purposes in FIG. 6, although other quantities may be utilized) coupled together in a series arrangement, with each drive sub-submodule 101 being configured to drive one or more elements (shown schematically) of a corresponding processing station 14' of a necker machine 10' (e.g., without limitation, processing stations 14 of necker machine 10). In the example embodiment illustrated in FIGS. 6-11, each drive sub-module 101 includes a primary drive sub-module 102 and a secondary drive sub-module 202. As used herein, "primary" and "secondary" are used merely to distinguish different components of the same or similar construction and/or arrangement and are not intended to indicate a hierarchy or relative importance of such components with respect to each other or any other components.

Figure 6:
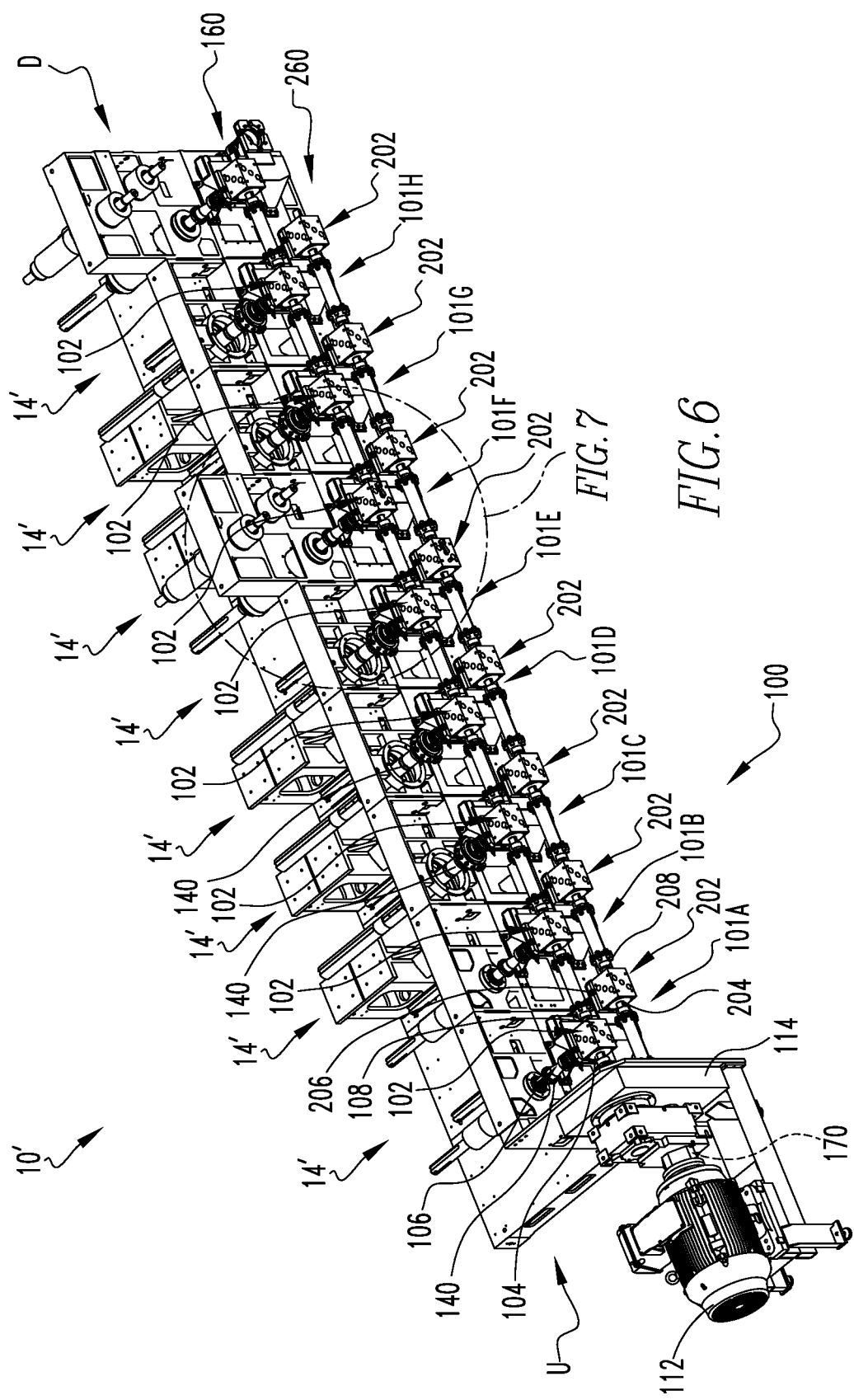
FIG. 6 is a partially schematic perspective view showing a drive assembly for a necker machine in accordance with one example embodiment of the disclosed concept.
Figure 7:
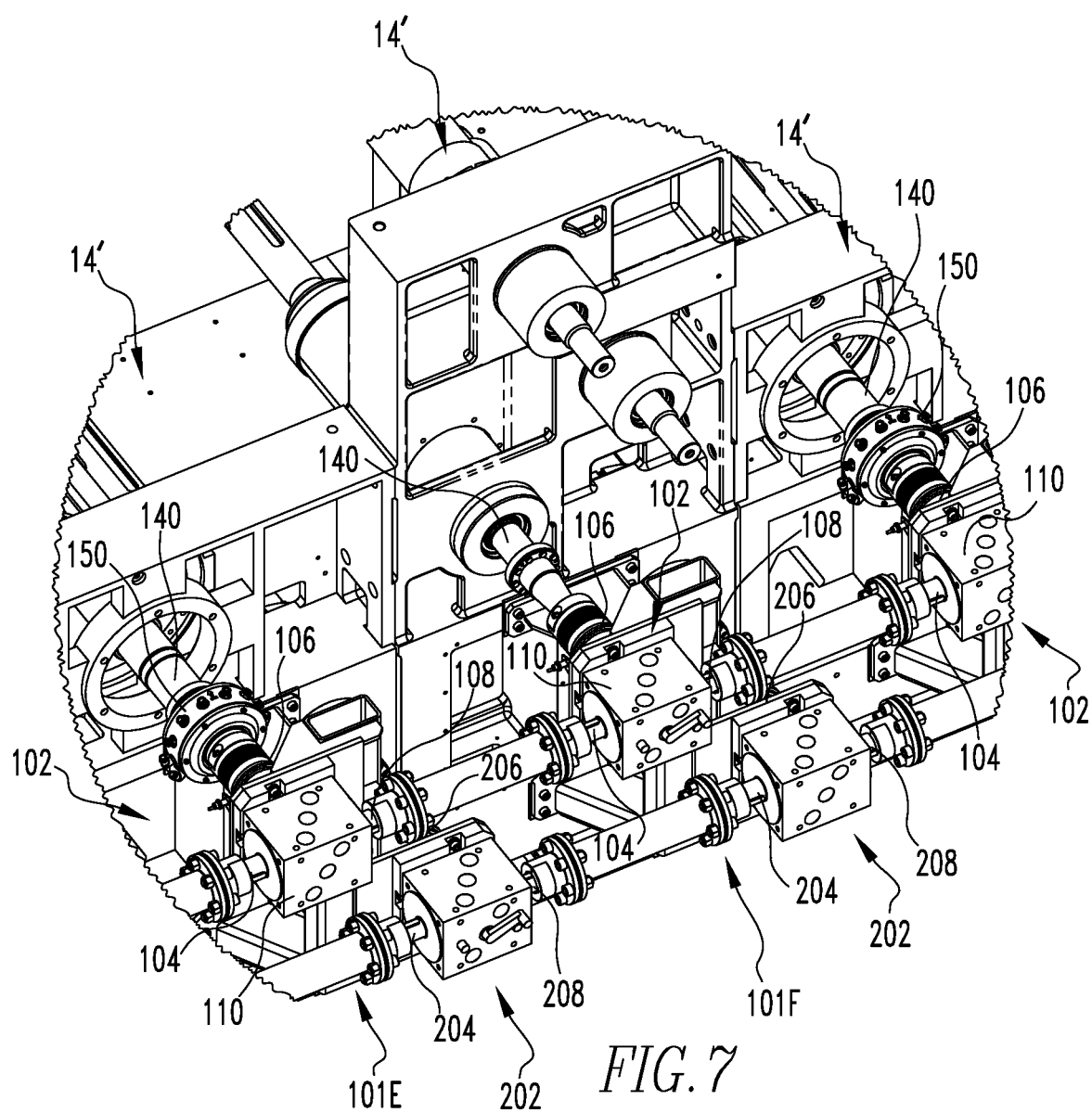
FIG. 7 is a detail view of a portion of the drive assembly of FIG. 6.

Referring to FIG. 7, each primary drive sub-module 102 includes a primary input shaft 104, a first primary output shaft 106 that is operatively coupled to the primary input shaft 104, and a second primary output shaft 108 that is also operatively coupled to the primary input shaft 104. Accordingly, rotation of the primary input shaft 104 in a given rotational direction results in a corresponding rotation of each of the first and second primary output shafts 106, 108. In the example embodiment illustrated in FIGS. 6-11, the first primary output shaft 106 of each primary drive sub-module 102 is operatively coupled to the primary input shaft 104 thereof via a primary right-angle gearbox 110 of any suitable arrangement. In such arrangement the primary input shaft 104 rotates about a primary input axis (not numbered) and the first primary output shaft 106 rotates about a first primary output axis (not numbered) that is perpendicular to the primary input axis. Further in the example embodiment illustrated in FIGS. 6-11, the second primary output shaft 108 is aligned with the primary input shaft 104 such that the second primary output shaft 108 rotates about a second primary output axis (not numbered) that coincides with the primary input axis. The use of such right-angle gearboxes 110 eliminates any need for a common oil bath such as previously discussed in the Background Information and typically require little to no maintenance as such gearboxes 110 may be sealed for life. Additionally, such gearboxes 110 may utilize composite gears to further reduce/eliminate the need for lubrication. In such example, the primary input shaft 104 and the second primary output shaft 108 are sized to transmit the power required by the entire necker machine 10' while the first primary output shaft 106 is sized (smaller) to merely transmit the power required for the associated processing station 14'. It is to be appreciated that other relative sizings of shafts 104, 106 and 108 may be employed without varying from the scope of the disclosed concepts. Additionally, in such example each of the primary input shaft 104 and the second primary output shaft 108 comprises a different portion of a single unitary through shaft. However, it is to be appreciated that the primary input shaft 104 and the second primary output shaft 108 may be separate shafts without varying from the scope of the disclosed concepts.

Referring to FIG. 6, in the primary drive sub-module 102 of the leftmost drive sub-module 101A (i.e., the most upstream of sub-modules 101), the primary input shaft 104 is operatively coupled to a main drive assembly motor 112 that drives the drive assembly 100. Such operative coupling between the main drive assembly motor 112 and the primary input shaft 104 may be accomplished via any suitable arrangement, for example via a main gearbox 114 (discussed further below), such as shown in the example embodiment illustrated in FIGS. 6-11. Continuing to refer to the most upstream sub-module 101A, the first primary output shaft 106 of the primary drive sub-module 102 is operatively coupled, via any suitable arrangement, to a first drive shaft 140 of the corresponding processing station 14'. In an example embodiment where the drive assembly 100 is sized and configured to replace the drive assembly 18 of the necker machine 10, the first primary output shaft 106 would be operatively coupled to the primary drive shaft 40 of the most upstream processing station 14. For each of the subsequent primary drive sub-modules 102 downstream, the first primary output shaft 106 thereof is similarly coupled to the corresponding first drive shaft 140 of the processing station 14' associated therewith. Meanwhile, the primary input shaft 104 of each of such downstream primary drive sub-modules 102 is operatively coupled to the second primary output shaft 108 of the primary drive-sub module 104 positioned immediately adjacent upstream.

Hence, in the example drive assembly 100 illustrated in FIGS. 6-11, the primary input shaft 104 of the primary drive sub-module 102 of the most upstream drive sub-module 101A is driven by the main drive assembly motor 112 via the main gearbox 114. The aforementioned primary drive shaft 104 drives the corresponding first primary output shaft 106 that drives the first drive shaft 140 of the associated processing station 14', and also drives the second primary output shaft 108 that drives the primary input shaft 104 of the primary drive sub-module 102 of the immediately adjacent downstream drive sub-module 101B. The drive sub-module 101B functions similarly as the drive sub-module 101A, thus driving both the first drive shaft 140 of the corresponding processing station 14' associated therewith and the primary drive sub-module 102 of the next downstream drive sub-module 101C. The drive arrangement is the same throughout the length of the drive assembly 100 whether it be anywhere from only two primary drive sub-modules 102 to arrangements having twenty or more primary drive sub-modules 102. The combination of all of the primary drive submodules 102 forms a primary drive line 160 that extends the length of the necker machine 10'. In the illustrated example embodiment, all of the primary drive submodules 102 are of the same arrangement, however, it is to be appreciated that the arrangement of particular primary drive submodules 102 within the primary drive line 160 may be varied for particular applications without varying from the scope of the disclosed concepts.

In order to assist in timing of each primary drive module 102 with the associated processing station 14' of the necker machine 10', one or more of the primary drive modules 102 may include a primary clutch unit 150 that is positioned to selectively couple the first primary output shaft 106 to the corresponding first drive shaft 140 of the associated processing station 14'. Each primary clutch unit 150 is selectively movable among: a first positioning wherein the first primary output shaft 106 is operatively coupled to, and thus able to drive the first drive shaft 140, and a second positioning wherein the first primary output shaft 106 is disengaged from, and thus not able to drive, the first drive shaft 140. In the case of a jam or other problem within a processing station 14', the primary clutch unit 150 may be used to decouple the associated primary drive module 102 from the processing station 14', thus preventing mechanical damage to one or both of the processing station 14' or to the primary drive module. Such arrangement may further include a position sensing system (not numbered) that is structured to sense and provide an indication of the relative rotational positioning of the first primary output shaft 106 and the first drive shaft 140. Additionally, one or more braking mechanisms (not numbered) may be provided along the primary drive line 160 for selectively braking the primary drive line 160 to safely stop or otherwise control the speed of the primary drive line 160.

Figure 10:
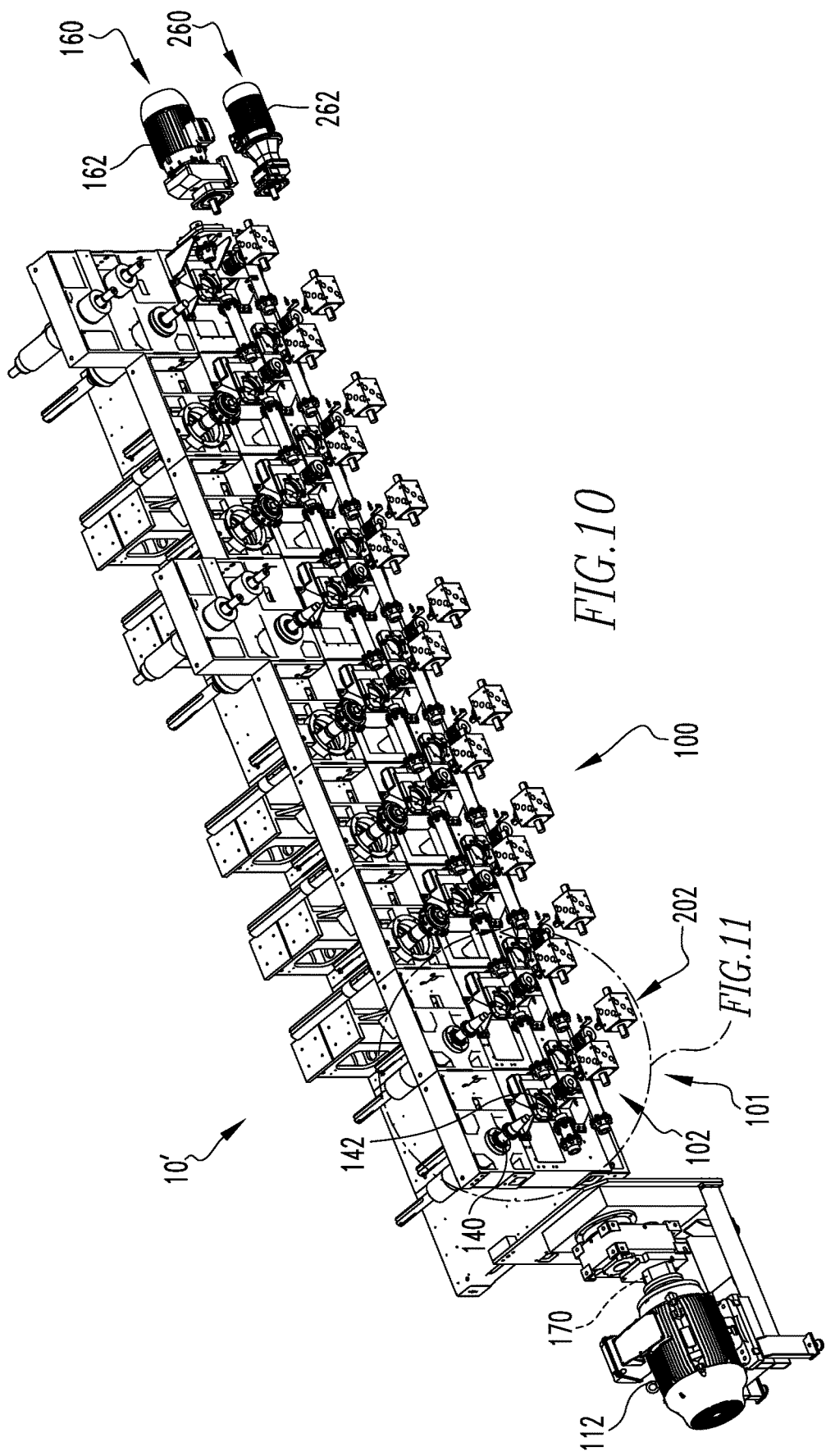
FIG. 10 is a partially schematic perspective view of the drive assembly of FIGS. 6, 8 and 9 shown exploded.
Figure 11:
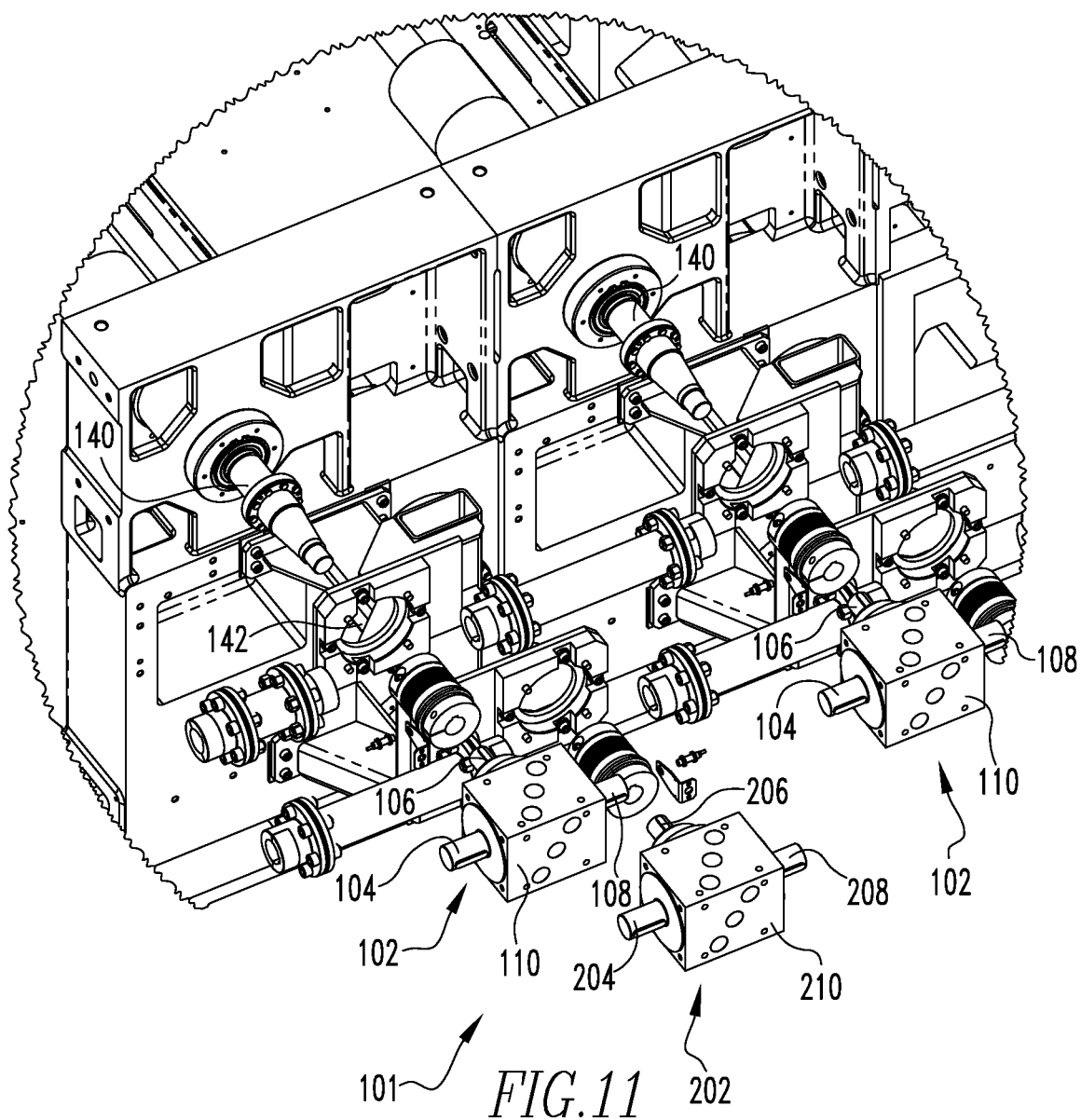
FIG. 11 is a detail view of a portion of the drive assembly of FIG. 10.

As shown in FIGS. 8-10, in order to control windup of primary drive line 160 from main drive assembly motor 112, drive assembly 100 may further include a primary drag motor 162 that is operatively coupled to primary drive line 160 via the second primary output shaft 108 of the primary drive sub-module 102 of the downstream-most drive sub-module 101 (e.g., drive sub-module 101H of FIG. 6). In one example embodiment, a primary drag motor 162 of about 20% the power of the main drive assembly motor 112 was employed, however, a primary drag motor 162 of different relative size may be employed without varying from the scope of the disclosed concept.

Referring again to FIG. 7, each secondary drive sub-module 202 is of generally the same or similar arrangement as the primary drive sub-module 102 associated therewith and as such includes a secondary input shaft 204, a first secondary output shaft 206 that is operatively coupled to the secondary input shaft 204, and a second secondary output shaft 208 that is also operatively coupled to the secondary input shaft 204. Accordingly, rotation of the secondary input shaft 204 in a given rotational direction results in corresponding rotation of each of the first and second secondary output shafts 206, 208. In the example embodiment illustrated in FIGS. 6-11, the first secondary output shaft 206 of each secondary drive sub-module 202 is operatively coupled to the secondary input shaft 204 thereof via a secondary right-angle gearbox 210. Each secondary right-angle gearbox 210 may be of any suitable arrangement without varying from the scope of the disclosed concepts. In an example embodiment, each secondary right-angle gearbox 210 is of generally the same arrangement as each primary right-angle gearbox 110 but of a smaller size due to the lesser output power requirements thereof. In such arrangement the secondary input shaft 204 rotates about a secondary input axis (not numbered) and the first secondary output shaft 206 rotates about a first secondary output axis (not numbered) that is perpendicular to the secondary input axis. Further in the example embodiment illustrated in FIGS. 6-11, the second secondary output shaft 208 is aligned with the secondary input shaft 204 such that the second secondary output shaft 208 rotates about a second secondary output axis (not numbered) that coincides with the secondary input axis. The use of such right-angle gearboxes 210 eliminates any need for a common oil bath such as discussed in the Background Information and typically require little to no maintenance as such gearboxes 210 may be sealed for life. Additionally, such gearboxes 210 may utilize composite gears to further reduce/eliminate the need for lubrication.

Referring to FIG. 6, in the secondary drive sub-module 202 of the leftmost drive sub-module 101A (i.e., the most upstream sub-module 101), the secondary input shaft 204 is operatively coupled to the main drive assembly motor 112. Such operative coupling between the main drive assembly motor 112 and the secondary input shaft 204 may be accomplished via any suitable arrangement. In the example embodiment illustrated in FIGS. 6-11 such coupling between the main drive motor 112 and the secondary input shaft 204 is accomplished via the main gearbox 114. In such example, main gearbox 114 includes a main input shaft 170 operatively coupled to the main drive assembly motor 112, a first main output shaft 172, and a second main output shaft 174. In such example embodiment, the first main output shaft 172 is operatively coupled to the main input shaft 170 so as to turn in the same direction and at the same speed as the main input shaft 170. Meanwhile, the second main output shaft 174 is operatively coupled to the main input shaft 170 so as to turn in the opposite direction as the main input shaft 170 at ⅗ the speed of the main input shaft. As generally previously described, the first main output shaft 172 is operatively coupled to the primary input shaft 104 of the primary drive module 102 of the most upstream drive sub-module 101A. The second main output shaft 174 is operatively coupled to the secondary input shaft 204 of the secondary drive module 202 of the most upstream drive sub-module 101A. In another example embodiment, in the secondary drive sub-module 202 of the leftmost drive sub-module 101A (i.e., the most upstream sub-module 101), the secondary input shaft 204 is operatively coupled a secondary drive assembly motor instead of to the main drive assembly motor 112. In such arrangement the secondary drive assembly motor may be sized smaller than the main drive assembly motor 112 due to the lesser power requirements of the secondary drive arrangement.

Continuing to refer to the most upstream sub-module 101A, the first secondary output shaft 206 of the secondary drive sub-module 202 is operatively coupled to a second drive shaft 142 of the corresponding processing station 14'. In an example embodiment where drive assembly 100 is sized and configured to replace drive assembly 18 of necker machine 10, the first secondary output shaft 206 would be operatively coupled to the secondary drive shaft 42 of the most upstream processing station 14. For each of the subsequent secondary drive sub-modules 202 downstream, the first secondary output shaft 206 thereof is operatively coupled to the corresponding second drive shaft 142 of the processing station 14' associated therewith, while the secondary input shaft 204 of each of such downstream secondary drive sub-modules 202 is operatively coupled to the second secondary output shaft 208 of the secondary drive-sub module 204 positioned immediately adjacent upstream.

Hence, in the example drive assembly 100 illustrated in FIGS. 6-11, the secondary input shaft 204 of the secondary drive module 202 of the most upstream drive sub-module 101A is driven by the main drive assembly motor 112 via the main gearbox 114. The aforementioned secondary drive shaft 204 drives the corresponding first secondary output shaft 206 that drives the second drive shaft 142 of the associated processing station 14', and also drives the second secondary output shaft 208 that drives the secondary input shaft 204 of the secondary drive sub-module 202 of the immediately adjacent downstream drive sub-module 101B. The drive sub-module 101B functions similarly as the drive sub-module 101A, thus driving the second drive shaft 142 of the corresponding processing station 14' associated therewith and the secondary drive sub-module 202 of the next downstream drive sub-module 101C. The drive arrangement is the same throughout the length of the drive assembly 100 whether it be anywhere from only two secondary drive sub-modules 202 to arrangements having twenty or more secondary drive sub-modules. The combination of all of the secondary drive submodules 202 forms a secondary drive line 260 that extends the length of the necker machine 10' along the primary drive line 160. In the illustrated example embodiment, all of the secondary drive submodules 202 are of the same arrangement, however, it is to be appreciated that the arrangement of particular secondary drive submodules 202 within the secondary drive line 260 may be varied for particular applications without varying from the scope of the disclosed concepts.

In order to assist in timing of each secondary drive module 202 with the associated processing station 14' of the necker machine 10', one or more of the secondary drive modules 202 may include a secondary clutch unit (not numbered) positioned to selectively coupled the first secondary output shaft 206 to the associated second drive shaft 142 of the associated processing station 14'. Each secondary clutch unit is selectively movable among: a first positioning wherein the first secondary output shaft 206 is operatively coupled to, and thus able to drive the second drive shaft 142, and a second positioning wherein the first secondary output shaft 206 is disengaged from, and thus not able to drive, the second drive shaft 142. In the case of a jam or other problem within a processing station 14', the secondary clutch unit may be used to decouple the associated secondary drive module 202 from the processing station 14', thus preventing mechanical damage to one or both of the processing station 14' or to the secondary drive module 202. Such arrangement may further include a position sensing system (not numbered) that is structured to sense and provide an indication of the relative rotational positioning of the first secondary output shaft 206 and the second drive shaft 142. Additionally, one or more braking mechanisms (not numbered) may be provided along the secondary drive line 260 for selectively braking the secondary drive line 260 to safely stop or otherwise control the speed of the secondary drive line 260.

As shown in FIGS. 8-10, in order to control windup of secondary drive line 260 from main drive assembly motor 112, drive assembly 100 may further include a secondary drag motor 262 that is operatively coupled to the secondary drive line 260 via the second secondary output shaft 208 of the secondary drive sub-module 202 of the downstream-most drive sub-module 101 (e.g., drive sub-module 101H of FIG. 6). In another example embodiment, the secondary drive line 260 is coupled to primary drag motor 162, e.g., via a suitable gearbox, instead of a separate secondary drag motor 262.

From the foregoing example embodiment it is thus to be appreciated that embodiments of the concepts disclosed herein may readily be used in place of conventional drive arrangements that traditionally use large gear trains, which require significant power, lubrication oil bath and suffer from teeth bite or backlash. Such concepts as disclosed may also be readily used in place of other alternative approaches that have been tried or contemplated. It is also to be appreciated that the modular design of drive assembly as described herein allows for easy isolation, maintenance and replacement of parts within the assembly, without requiring complete disassembly or replacement of the entire drive assembly. Such design also provides for jams or other failures to be readily addressed in minimal amounts of time.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A drive assembly for a necker machine having a frame assembly and a plurality of processing stations, each processing station having a number of drive shafts, said drive assembly comprising:
   a plurality of primary drive sub-modules, each primary drive sub-module comprising:
      a primary input shaft;
      a first primary output shaft operatively coupled to the primary input shaft; and
      a second primary output shaft operatively coupled to the primary input shaft;
   wherein for a first primary drive sub-module of the plurality of primary drive sub-modules:
      the primary input shaft is structured to be operatively coupled to, and driven by, a main drive assembly motor, and
      the first primary output shaft is structured to be operatively coupled to, and drive, an associated first drive shaft of the number of drive shafts of a first processing station of the number of processing stations,
   wherein for a second primary drive sub-module of the plurality of primary drive sub-modules:
      the primary input shaft is operatively coupled to, and driven by, the second primary output shaft of the first primary drive sub-module, and
      the first primary output shaft is structured to be operatively coupled to, and drive, an associated first drive shaft of the number of drive shafts of a second processing station of the number of processing stations, wherein at least one primary drive sub-module includes a primary clutch unit structured to selectively operatively couple the first primary output shaft to the associated first drive shaft, and wherein the primary clutch unit is selectively moveably among:
- a first positioning wherein the first primary output shaft is operatively coupled to, and thus able to drive, the associated first drive shaft; and
- a second positioning wherein the first primary output shaft is disengaged from, and thus not able to drive, the associated first drive shaft.

2. The drive assembly of claim 1, wherein the plurality of primary drive modules comprises at least three primary drive sub-modules, and wherein for a third primary drive sub-module of the plurality of primary drive sub-modules:
the primary input shaft is operatively coupled to, and driven by, the second primary output shaft of the second primary drive sub-module, and
the first primary output shaft is structured to be operatively coupled to, and drive, one drive shaft of the number of drive shafts of a third processing station of the number of processing stations.

3. The drive assembly of claim 1, wherein for each primary drive sub-module, the first primary output shaft is operatively coupled to the primary input shaft via a primary right-angle gearbox.

4. The drive assembly of claim 1, wherein the at least one primary drive sub-module further includes a position sensing system structured to sense and provide an indication of the relative rotational positioning of the first primary output shaft and the associated first drive shaft.

5. The drive assembly of claim 1, wherein the at least one primary drive sub-module further includes a primary brake unit structured to selectively brake at least one of the primary input shaft, the first primary output shaft, or the second primary output shaft.

6. A drive assembly for a necker machine having a frame assembly and a plurality of processing stations, each processing station having a number of drive shafts, said drive assembly comprising:

a plurality of primary drive sub-modules, each primary drive sub-module comprising:
a primary input shaft;
a first primary output shaft operatively coupled to the primary input shaft; and
a second primary output shaft operatively coupled to the primary input shaft; and a plurality of secondary drive sub-modules, each secondary drive sub-module comprising:
a secondary input shaft;
a first secondary output shaft operatively coupled to the secondary input shaft; and
a second secondary output shaft operatively coupled to the secondary input shaft, wherein for a first primary drive sub-module of the plurality of primary drive sub-modules:
the primary input shaft is structured to be operatively coupled to, and driven by, a main drive assembly motor, and
the first primary output shaft is structured to be operatively coupled to, and drive, an associated first drive shaft of the number of drive shafts of a first processing station of the number of processing stations, wherein for a second primary drive sub-module of the plurality of primary drive sub-modules:
the primary input shaft is operatively coupled to, and driven by, the second primary output shaft of the first primary drive sub-module, and
the first primary output shaft is structured to be operatively coupled to, and drive, an associated first drive shaft of the number of drive shafts of a second processing station of the number of processing stations, wherein for a first secondary drive sub-module of the plurality of secondary drive sub-modules:
the secondary input shaft is structured to be coupled to, and driven by, the main drive assembly motor, and
the first secondary output shaft is structured to be operatively coupled to, and drive, a second drive shaft of the number of drive shafts of the first processing station, and wherein for a second secondary drive sub-module of the plurality of secondary drive sub-modules:
the secondary input shaft is operatively coupled to, and driven by, the second secondary output shaft of the first secondary drive sub-module, and
the first secondary output shaft is structured to be operatively coupled to, and drive, a second drive shaft of the number of drive shafts of the second processing station.

7. The drive assembly of claim 6, further comprising a main gearbox having a main input shaft, a first main output shaft operatively coupled to the main input shaft, and a second main output shaft operatively coupled to the main input shaft, wherein the main input shaft of the main gearbox is structured to be operatively coupled to, and driven by, the main drive assembly motor,
wherein the primary input shaft of the first primary drive sub-module is operatively coupled to, and driven by the first main output shaft of the main gearbox, and
wherein the secondary input shaft of the first secondary drive sub-module is operatively coupled to, and driven by the second main output shaft of the main gearbox.

8. The drive assembly of claim 7, further comprising:
the main drive assembly motor operatively coupled to the main input shaft of the main gearbox;
a primary motor operatively coupled to the second primary output shaft of the second primary drive sub-module; and
a secondary motor operatively coupled to the second secondary output shaft of the second secondary drive sub-module.

9. The drive assembly of claim 6, wherein the plurality of secondary drive modules comprises at least three secondary drive sub-modules, and wherein for a third secondary drive sub-module of the plurality of secondary drive sub-modules:
the secondary input shaft is operatively coupled to, and driven by, the second secondary output shaft of the second secondary drive sub-module, and
the first secondary output shaft is structured to be operatively coupled to, and drive, a second drive shaft of the number of drive shafts of a third processing station of the number of processing stations.

10. The drive assembly of claim 6, wherein for each secondary drive sub-module, the first secondary output shaft is operatively coupled to the secondary input shaft via a secondary right-angle gearbox.

11. The drive assembly of claim 6, wherein for each secondary drive sub-module, the first secondary output shaft is selectively operatively coupled to the secondary input shaft via a secondary clutch unit, and wherein the secondary clutch unit is selectively moveably among: a first positioning wherein the first secondary output shaft is operatively coupled to, and driven by, the secondary input shaft, and a second positioning wherein the first secondary output shaft is disengaged from, and not driven by, the secondary input shaft.

12. The drive assembly of claim 11, wherein for each secondary drive sub-module, the second secondary output shaft is selectively operatively coupled to the secondary input shaft via a secondary brake unit.

13. A necker machine comprising:
a frame assembly;
a plurality of processing stations, each processing station having a number of drive shafts, and
a drive assembly comprising:
a plurality of primary drive sub-modules, each primary drive sub-module comprising:
a primary input shaft;
a first primary output shaft operatively coupled to the primary input shaft; and
a second primary output shaft operatively coupled to the primary input shaft; and
a plurality of secondary drive sub-modules, each secondary drive sub-module comprising:
a secondary input shaft;
a first secondary output shaft operatively coupled to, and driven by, the secondary input shaft; and
a second secondary output shaft operatively coupled to, and driven by, the secondary input shaft,
wherein for a first primary drive sub-module of the plurality of primary drive sub-modules:
the primary input shaft is structured to be operatively coupled to, and driven by, a main drive assembly motor, and
the first primary output shaft is operatively coupled to, and drives, a first drive shaft of the number of drive shafts of a first processing station of the number of processing stations, and
wherein for a second primary drive sub-module of the plurality of primary drive sub-modules:
the primary input shaft is operatively coupled to, and driven by, the second primary output shaft of the first primary drive sub-module, and
the first primary output shaft is operatively coupled to, and drives, a first drive shaft of the number of drive shafts of a second processing station of the number of processing stations,
wherein for a first secondary drive sub-module of the plurality of secondary drive sub-modules:
the secondary input shaft is structured to be coupled to, and driven by, the main drive assembly motor, and
the first secondary output shaft is operatively coupled to, and drives, a second drive shaft of the number of drive shafts of the first processing station, and
wherein for a second secondary drive sub-module of the plurality of secondary drive sub-modules:
the secondary input shaft is operatively coupled to, and driven by, the second secondary output shaft of the first secondary drive sub-module, and
the first secondary output shaft is operatively coupled to, and drives, a second drive shaft of the number of drive shafts of the second processing station.

14. The necker machine of claim 13, further comprising a main gearbox having a main input shaft, a first main output shaft operatively coupled to the main input shaft, and a second main output shaft operatively coupled to the main input shaft,
wherein the main input shaft of the main gearbox is structured to be operatively coupled to, and driven by, the main drive assembly motor,
wherein the primary input shaft of the first primary drive sub-module is operatively coupled to, and driven by the first main output shaft of the main gearbox, and
wherein the secondary input shaft of the first secondary drive sub-module is operatively coupled to, and driven by the second main output shaft of the main gearbox.

15. The necker machine of claim 14, further comprising:
the main drive assembly motor operatively coupled to the main input shaft of the main gearbox;
a primary motor operatively coupled to the second primary output shaft of the second primary drive sub-module; and
a secondary motor operatively coupled to the second secondary output shaft of the second secondary drive sub-module.

16. The necker machine of claim 13, wherein:
the first drive shaft of the first processing station drives a processing apparatus of the first processing station;
the second drive shaft of the first processing station drives a transfer apparatus of the first processing station;
the first drive shaft of the second processing station drives a necking apparatus of the second processing station; and
the second drive shaft of the second processing station drives a transfer apparatus of the second processing station.

* * * * *